Nov. 13, 1956　　　P. J. O'SULLIVAN　　　2,770,066
INSECT TRAP
Filed Sept. 8, 1953

PAUL J. O'SULLIVAN,
INVENTOR.

BY Sellers and Latta

ATTORNEYS.

United States Patent Office 2,770,066
Patented Nov. 13, 1956

2,770,066

INSECT TRAP

Paul J. O'Sullivan, Pacoima, Calif.

Application September 8, 1953, Serial No. 378,841

1 Claim. (Cl. 43—107)

This invention relates to a method and apparatus for trapping and exterminating insects wherein a conventional fruit jar may be employed as the entrapment receptacle.

One object of the invention is to provide an insect entrapment device which may utilize discarded photographic film for the cover thereof.

Another object of the invention is to provide an inexpensive insect entrapment device.

A further object of the invention is to provide an inexpensive method of manufacturing a cover for an insect entrapment device wherein otherwise discarded photographic film may be formed into the desired cover.

Other objects and advantages will become apparent upon examination of the following specification and appended drawing in which.

Figure 1:
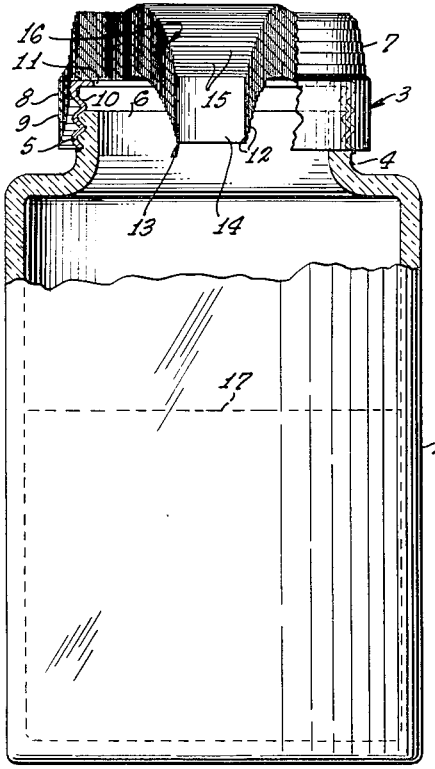
Fig. 1 is a side view of the complete insect entrapment device shown partly in section.
Figure 3:
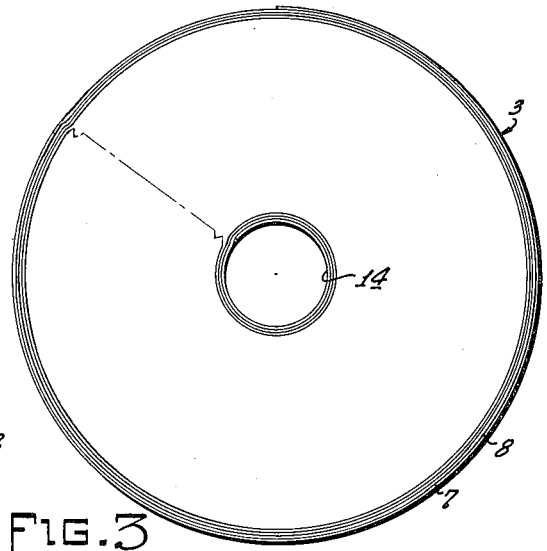
Fig. 3 is an underneath view of the cover with the threaded insert removed.
Figure 7:
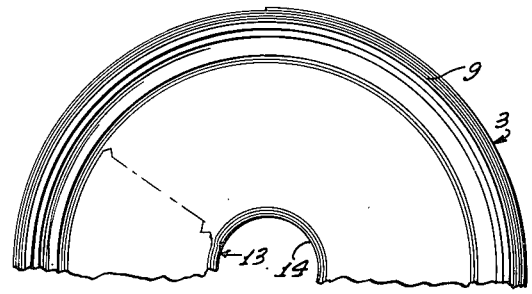
Fig. 7 is a fragmentary underneath view of the cover assembly.

The insect entrapment device comprises generally a receptacle 2 and a cover assembly designated generally by the numeral 3.

The receptacle may consist of a conventional fruit jar, if desired, wherein the neck 4 of the jar may be reduced in diameter and provided with external threads 5. The upper end of the jar is provided with the usual entrance mouth 6. The cover assembly consists of an insert 10 and a circular cap portion 7 which may be made from a single length of ribbon wound spirally upon itself and then formed to the desired shape in a manner which will be described hereinafter. The outermost convolutions 8 of the cap project from the normal horizontal plane of the cap in a direction generally axially thereof to form an overhanging peripheral flange or skirt 9. The internally threaded collar 10 is anchored to the cap within the confines of the peripheral flange 9. The collar has a large axial opening 11 therethrough. The collar may, if desired, consist of the ring portion alone of a conventional two piece "fruit jar lid." The innermost convolutions 12 of the cap project from the normal horizontal plane of the cap in a direction generally axially thereof to form a frustro-conically shaped nozzle or lip portion 13 which has an axial opening 14 therethrough. Each succeeding convolution of the ribbon within the nozzle portion presents a marginal edge 15 which is progressively beneath the marginal edge of the preceding convolution thereby resulting in a generally frustro-conical wall area referred to by the numeral 16 down which the insects are free to crawl thereby providing in effect an entrance ramp. When the insects have crawled on down thrown the opening 14 into the interior of the receptacle, they are then unable to find their way back out through opening 14 and they eventually drown or are otherwise exterminated by the liquid 17 within the receptacle. In order to induce the insects to enter the entrapment device an ingredient may be placed within the interior of the receptacle which is capable of enticing the insects to enter.

Figure 4:
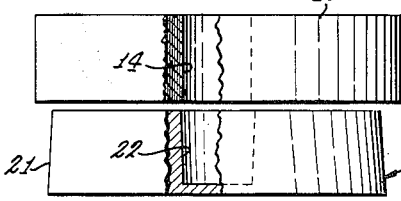
Figs. 4, 5 and 6 show the three important steps in the process of making the cover.
Figure 5:
Figure 2:
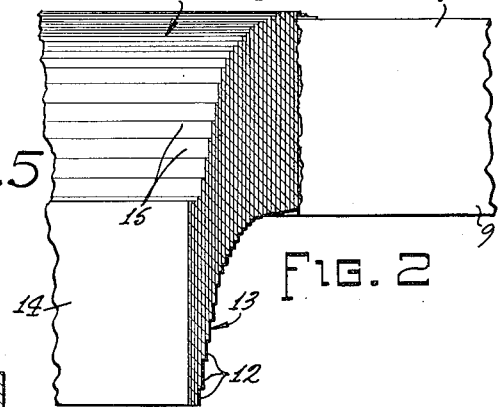
Fig. 2 is a fragmentary detail view of a portion of the cover.
Figure 6:
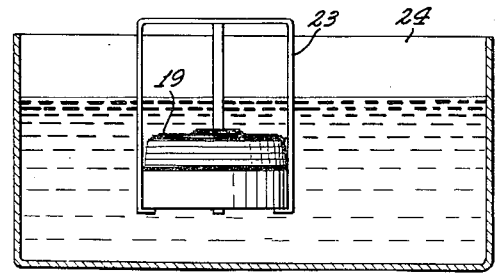

One method of forming the cap portion of the cover assembly is to employ a roll of photographic film which has outlived its usefulness for photographic reproduction purposes, the roll consisting of a continuous length of ribbon wound spirally upon itself in a common plane to form the "blank" 19 as shown in Fig. 4. The "blank" is positioned over a template 20, the template having an exterior wall 21 which may be tapered slightly so as to present a frustro-conical exterior wall and also having an axially located bore 22, the side walls of which may be slightly tapered. The axial opening 14 in the "blank" is positioned in registry above bore 22 and the "blank" is then pressed down over the template until the outermost convolutions are forced down alongside the exterior peripheral wall of the template as shown in the dotted lines in Fig. 5 thereby forming the external peripheral flange 9. The innermost convolutions of the "blank" are likewise forced down into the bore 22 of the template thereby forming the frustro-conical nose portion 13. The "blank" may then be withdrawn from the template and positioned in a rack device 23 and then lowered into a dipping tank 24. If the "blank" is formed of photographic film such as nitrate cellulose or acetate, then a solution such as acetone may be maintained in the dipping tank and when the "blank" is dipped thereinto the film swells and softens. After being withdrawn from the dipping tank evaporation will leave the "blank" in a generally solid homogeneous mass wherein adjacent convolutions are at least partially fused to each other. Then the internally threaded collar 10 is positioned within the annular recess afforded by flange 9 and may be anchored thereto by means of glue or some other suitable type of adhesive.

The completed cover assembly is simply threaded onto the externally threaded neck of the receptacle to complete the entrapment device. It will be understood that the ribbon material is exaggerated in all views for purposes of making an understandable disclosure. The actual wall thickness of the ribbon need not be any greater than the width of one of the fine lines on the drawing, however, a ribbon having a wall thickness comparable to that shown on the drawing could also be used satisfactorily, if desired. In Figs. 1, 2, 4 and 5 there are some convolutions of the ribbon shown in section, however, cross hatching lines are not used in the sectioned areas due to the impracticability of using same.

I claim:

In an insect trap, a cover for attachment to a receptacle having a threaded neck defining a mouth, comprising: a strip of thin ribbon of thickness, width and material conforming to the thickness, width and material of photographic film, said ribbon being wound spirally upon itself to form an intermediate body of flat ring form, succeeding convolutions of said ribbon being displaced axially in the same direction both at the periphery and the center of said intermediate body so as to form a central annular lip of acute angular section tapering to a relatively thin edge consisting not over three convolutions, and a peripheral skirt which is likewise of acute angular section, terminating in a thin edge, and an insert ring formed of sheet metal including a face flange secured to the inner wall of said flat ring body and a flange with a rolled thread projecting axially from the periphery of said face flange in radially spaced relation to said skirt, for threaded connection to said neck.

References Cited in the file of this patent

UNITED STATES PATENTS

| Number | Name | Date |
|---|---|---|
| 111,291 | Williams | Jan. 24, 1871 |
| 1,011,347 | Humpal | Dec. 12, 1911 |
| 1,139,717 | Pipenhagen | May 18, 1915 |
| 1,629,402 | March | May 17, 1927 |
| 1,867,252 | Crigler | July 12, 1932 |
| 2,045,018 | Loibl | Jan. 23, 1936 |
| 2,229,982 | Mansur et al. | Jan. 18, 1941 |
| 2,332,101 | Mancuso | Oct. 19, 1943 |